United States Patent [19]
Pikkarainen et al.

[11] Patent Number: 5,701,106
[45] Date of Patent: Dec. 23, 1997

[54] METHOD AND MODULATOR FOR MODULATING DIGITAL SIGNAL TO HIGHER FREQUENCY ANALOG SIGNAL

[75] Inventors: Juha Pikkarainen; Veijo Kontas, both of Oulu, Finland

[73] Assignee: Nokia Mobile Phones Ltd., Salo, Finland

[21] Appl. No.: 658,619

[22] Filed: Jun. 5, 1996

[30] Foreign Application Priority Data

Jun. 6, 1995 [FI] Finland .................. 952775

[51] Int. Cl.⁶ .................. H04L 27/12; H04L 27/20
[52] U.S. Cl. .................. 332/100; 332/103; 375/298; 375/303; 375/308
[58] Field of Search .................. 332/100, 101, 332/102, 103, 104, 105; 375/261, 272, 279, 298, 302, 303, 308

[56] References Cited

U.S. PATENT DOCUMENTS

| 5,091,919 | 2/1992 | Kuisma | 332/160 |
|---|---|---|---|
| 5,123,031 | 6/1992 | Kuisma | 332/160 |
| 5,124,672 | 6/1992 | Kuisma | 332/103 |
| 5,191,331 | 3/1993 | Karema et al. | 341/131 |
| 5,248,972 | 9/1993 | Karema et al. | 341/143 |
| 5,311,179 | 5/1994 | Vaisanen et al. | 341/118 |
| 5,313,205 | 5/1994 | Wilson | 341/144 |
| 5,325,396 | 6/1994 | Critchlow et al. | 375/8 |
| 5,331,321 | 7/1994 | Mannonen | 341/110 |
| 5,446,423 | 8/1995 | Bienz et al. | 332/170 |
| 5,473,280 | 12/1995 | Ohnishi et al. | 329/304 |
| 5,491,832 | 2/1996 | Malkamaki et al. | 455/33.1 |

FOREIGN PATENT DOCUMENTS

| 0 458 385 A3 | 11/1991 | European Pat. Off. |
| 3839919 A1 | 6/1990 | Germany . |

OTHER PUBLICATIONS

Morling, R.C.S. et al.: "The Design of a Sigma–Delta Codec for Mobile Telephone Applications" Second International Conference on Advanced A–D and D–A Conversion Techniques and Their Applications, 6–8 Jul. 1994, Cambridge, UK (Abstract only).

Lu A.K. et al.: "A High–Quality Analog Oscillator Using Oversampling D/A Conversion Techniques" IEEE Transactions on Circuits and Systems II: Analog and Digital Signal Processing, vol. 41, No. 7, pp. 437–444, Jul. 1994, USA (Abstract only).

Stewart, R.W.: "An Overview of Sigma–Delta ADCs and DAC Devices" IEE Colloquim on Oversampling and Sigma–Delta Strategies for DSP (Digital Signal Processing) (Digest No. 1995/217) pp. 1/1–9, 23 Nov. 1995, London, UK (Abstract only).

Bhagwati et al. Design Methodology for $\Sigma\Delta M$, IEEE Trans. Comun., vol. COM–31, pp.360–370, Mar. 1983.

*Primary Examiner*—Siegfried H. Grimm
*Attorney, Agent, or Firm*—Perman & Green, LLP

[57] ABSTRACT

A method and modulator for modulating a digital signal to an analog intermediate-frequency signal. A baseband digital signal (I, Q) is taken to a digital-to-analog converter (71, 710) in which it is sampled at a certain sampling frequency ($f_{in}$) and converted to an analog signal. The conversion produces a baseband signal ($f_{sig}$) and signals ($N*f_{in}$, $f_{Ni}$) at multiples of the sampling frequency ($f_{in}$). The sampling frequency is increased, advantageously according to a sigma-delta D/A conversion, and one of the signals ($N*f_{in}$, $f_{Ni}$) at multiples of the sampling frequency ($f_{in}$), produced by the conversion, is selected as the output signal ($f_{IF}$), advantageously a multiple ($N*f_{in}$, $f_{Ni}$) of the sampling frequency that is directly at the intermediate frequency or transmission frequency.

16 Claims, 8 Drawing Sheets

METHOD AND MODULATOR FOR MODULATING DIGITAL SIGNAL TO HIGHER FREQUENCY ANALOG SIGNAL

BACKROUND OF THE INVENTION

The present invention pertains to a method and modulator for modulating a digital signal to a higher-frequency analog Signal, in which a baseband digital signal is taken to a digital-to-analog converter, wherein said digital signal is sampled at a certain sampling frequency and converted into an analog signal, and as a result of the conversion the digital-to-analog converter produces a baseband signal and signals at the multiples of the sampling frequency. Modulation is performed in mobile phones transmitting at radio frequencies to modulate a baseband speech or signalling information to a radio-frequency carrier wave for transmission. The invention is related to modulation performed in digital mobile phones.

In general, a mobile phone may be divided functionally into four parts: the user part, or user interface, control part, audio part and radio frequency part, of which the last three constitute the radio unit of the mobile phone. FIG. 1 is a general block diagram of a mobile phone displaying blocks located in various parts of the mobile phone. The user of the mobile phone communicates with the phone through the user interface 20, which usually includes a loudspeaker 21, microphone 22, keypad 23 and a display 24. The user interface 20 may also include other interfaces, e.g. modem for data transfer, a hands free facility and voice activation. The radio unit 30 comprises the baseband parts, which usually include a control part 40 and an audio part 50, and the radio frequency part 60 of the mobile phone.

The control part 40 usually includes as a central processing unit a microprocessor 41 that performs the procedures required for establishing a call and controls the operation of the mobile phone by means of various programs. These include e.g. cellular software, user interface software and different types of monitoring programs (battery capacity level monitoring, for example) and test programs facilitating maintenance. Cellular software handles the signalling between the mobile phone and a base station. User interface software controls the communication between the user and the other pieces of software, things like interpretation of keystrokes, display control and so on. The control part 40 also includes memories 42 used in the mobile phone to store among other things the operating system, serial number and telephone number of the mobile phone and user rights for various services, and which are also used as temporary strorages during call establishment.

The baseband part of a digital mobile phone includes among other things speech and channel coding, compression of information into bursts and decompression of bursts into continuous signal and a channel equalizer. The audio part 50 may be implemented as software, for example, using a signal processor 51.

In the radio frequency part 60, the speech and signalling information produced by the baseband part is transmitted to the radio path and, correspondingly, received from the radio path. Communication with the baseband part of the mobile phone occurs via a special radio frequency interface in which e.g. the required A/D and D/A conversions are carried out. The radio frequency part 60 includes an antenna 61, a duplexer 62, a transmitter 63, a receiver 64 and a frequency synthesis part 65.

In the transmitter part 63, the speech and signalling information is modulated to a radio-frequency carrier wave and power amplified. Usually the modulation is carried out at an intermediate frequency (in a modulator) that is mixed to the desired transmit frequency (in a transmitter). Various modulation methods are used depending on the signal type and on the requirements set for the transmission. For analog information transfer, it is possible to use e.g. frequency modulation (FM) or frequency shift keying (FSK) modulation, and for digital information transfer, it is possible to use e.g. π/4-shifted differential quadrature phase shift keying (π/4 DQPSK) modulation or gaussian minimum shift keying (GMSK) modulation, both of which handle the signal as complex I/Q signal.

This patent application deals primarily with the modulation of a digital, advantageously complex, signal, whereby the signal is handled as two signals phase shifted with respect to each other, which are modulated and finally added together. The usual case is that two signals with a 90° phase shift are summed. Below there are described a usual method used for modulating a complex signal, as well as a modulator, with reference to FIGS. 2 and 3.

FIG. 2 shows a modulator known in the prior art in which the incoming bit $a_n$ (e.g. a bit stream produced by the speech and channel coding functions) is first processed in a digital signal processing block 70, where the serial bit stream is converted into two separate bit streams and encoded to I and Q branch signals. The I and Q signals are D/A converted with D/A converters 71, whereby the conversion results in a spectrum similar to that shown in FIG. 3, where $f_{sig}$ represents the maximum frequency of the effective signal, whereby, when taking samples for the D/A converter at the frequency of $f_{in}$, the signal spectrum is repeated at the multiples of this sampling frequency $f_{in}$, as shown in FIG. 3. The multiples $f_{in}-f_{sig}$ and their mirror frequencies $f_{in}+f_{sig}$ produced by a normal D/A conversion are interfering frequencies that must be low-pass filtered, so that they do not interfere with other (adjacent) radio channels. The low-pass filter 72 produces at its output a rounded analog baseband signal $f_{sig}$. The frequency response of the low-pass filter 72 is shown in FIG. 3 as $f_{(LP)}$. The baseband signals $I_t$ and $Q_t$ are modulated to the carrier wave frequency by multiplying them by a local oscillator signal $f_c$ at the carrier wave frequency, whereby the $I_t$ and $Q_t$ signals are multiplied by local oscillator signals with a 90° phase shift; e.g. by multiplying the $I_t$ signal by cos ($2\pi f_c t$) and the $Q_t$ signal by $-\sin(2\pi f_c t)$. The 90° phase shift can be produced with a phase shifter 76. Multiplication of signals is performed with mixers 73 and 74, the outputs of the mixers thus producing a signal at the carrier wave frequency, ie. usually an intermediate frequency signal, which contains the mixing result of the analog $I_t$ and $Q_t$ signals and the local oscillator signal $f_c$. The output signals of the mixers 73, 74 are summed in an adder 75, and the modulator output signal $f_{IF}$ is thus obtained from the adder 75 as a sum signal of the output signals of the mixers.

A similar arrangement is disclosed in U.S. Pat. No. 5,325,396 in which sine and cosine signals at the carrier wave frequency (intermediate frequency) generated by a separate generator are brought to a modulator to modulate I and Q signals to an intermediate frequency.

A disadvantage of such modulation methods and modulators known in the prior art is that their implementations require a lot of space. Because of low-pass filtering and mixing and because of processing signals at different frequencies, a modulator includes so many components that its implementation usually requires at least two integrated circuits: the D/A converters and low-pass filters on one (IC1 in the drawing) and the components required for the mixing on the other circuit IC2. In addition, a frequently occurring problem is that a DC component included in the frequency band of the low-pass filter 72 (see FIG. 3) is passed through to the mixers 73 and 74 which causes undesirable carrier leakage. Admittedly the DC component can be filtered by placing a capacitor in the I and Q branch between the low-pass filter 72 and mixer 73, 74. However, there is the problem that as the signal $f_{sig}$ is near the zero frequency, the DC filter capacitor has to be big (in order to achieve high-pass filtering in which the passband limiting frequency stays near the zero frequency). Charging a large capacitor takes a lot of time, and therefore, in time division multiple access systems, the time division characteristic of the system cannot be utilized by switching off the modulator between bursts. Furthermore, due to processing signals in two branches, the method requires the use of two large capacitors.

SUMMARY OF THE INVENTION

The object of the present invention is to avoid the problems mentioned above and to provide a modulation method and modulator with which a complex signal can be modulated and shifted directly from the baseband frequency to an intermediate frequency or even directly from the baseband frequency to the transmission frequency. This can be achieved by taking samples from the incoming bit stream with a D/A converter, preferably a sigma-delta type D/A converter, and selecting as output directly a multiple of the sampling frequency provided by the D/A converter. Advantageously a multiple at the D/A converter output that is at the desired intermediate frequency or at the transmission frequency is selected. A modulator according to the invention can be implemented using fewer components which means reduced costs and, furthermore, the current consumption with the method and modulator according to the invention is smaller than in prior art systems. In addition, since the signal is a multiple of the sampling frequency and, therefore, not near the zero frequency, a small capacitor suffices to filter the DC component (as the passband limiting frequency of the high-pass filtering function realized by the DC filter capacitor does not have to be near the zero frequency, ie. it is not necessary that the transfer function rises steeply from the attenuation band to the passband after the zero frequency as is the case in the prior art).

It is characteristic of the method according to the invention that one of said signals at multiples of the sampling frequency is selected as the output signal.

Correspondingly, it is characteristic of the modulator according to the invention that it includes means for selecting the output signal from among said signals at multiples of the sampling frequency.

In a preferred embodiment of the invention, a complex digital I/Q signal is modulated directly to an intermediate frequency using a sigma-delta D/A converter. Advantages of a sigma-delta D/A converter are high accuracy, good reliability, good stability and good linearity.

BRIEF DESCRIPTION OF THE DRAWINGS

FIGS. 9a–9e illustrate the behavior of the signal spectrum of a sigma-delta D/A converter according to FIG. 8 in various stages, with the reference numbers of the signals that are taken to/obtained from the different blocks of the sigma-delta D/A converter indicated at the right-hand side; and wherein FIG. 9a shows the multiple frequency $N*f_{in}$ vs. $f_{sig}$ for the I - or Q - signal; FIG. 9b shows an interpolation of the signal of FIG. 9a; FIG. 9c depicts the gray area that corresponds to the quantization noise spread evenly across the frequency band after sinc filtering and prior to the sigma-delta modulation; FIG. 9d depicts as a gray area the quantization noise shaped in the sigma-delta modulation between the signal band $f_{sig}$ and its multiple $N*f_{in}$ (excluding them); and FIG. 9e illustrates the selection of the multiple frequency $N*f_{in}$ (=$f_{Ni}$) as output frequency with a band-pass filter in which $f(_{BP})$ is the frequency response.

DETAILED DESCRIPTION

Figure 4:
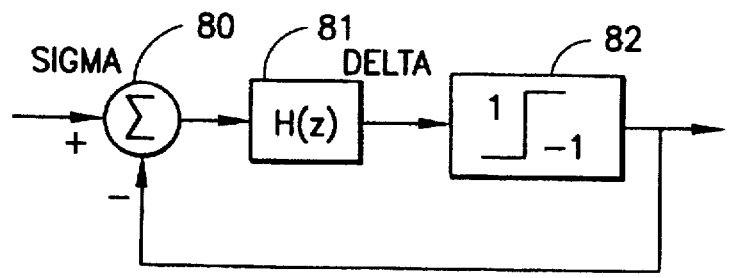
FIG. 4 shows a digital implementation of a sigma-delta modulator.

FIG. 4 illustrates a digital implementation of a so-called sigma-delta modulator. The name "sigma-delta" comes from the configuration of the sigma-delta modulator which first contains an adder 80 (summing point), which is usually represented by the Greek letter "sigma" (Σ), and a block 81, which performs integration, followed by a so-called delta modulator including a quantizer 82 which is based on quantizing the difference of consecutive samples, hence the name "delta" (Δ). Block 81 may realize the transfer function $H(z)=$ $$\frac{1}{1-z},$$

for example. In sigma-delta D/A converters the sampling frequency is first increased e.g. by interpolating and then the number of bits in the samples is decreased, whereby e.g. a stream of words containing several bits can be converted to a stream of 1-bit words, or to a bit stream. Noise is filtered after the increase of the sampling frequency and prior to the decrease of the number of bits. In practice, quantization noise (white noise) is filtered so that the major part of the noise is left outside the signal band. The feedback loop in FIG. 4 serves as a low-pass filter for the input signal and as a high-pass filter for the noise generated by the quantizer; this feature is called noise shaping.

Figure 5:
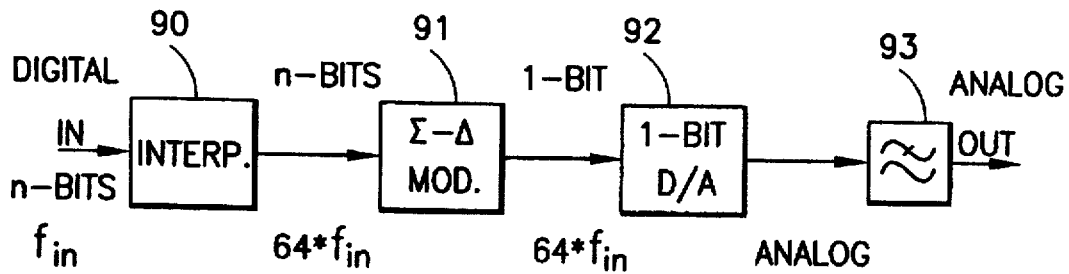
FIG. 5 shows a block diagram of a sigma-delta D/A converter.

FIG. 5 is an example of the block diagram of a sigma-delta D/A converter. An n-bit input signal at the frequency $f_{in}$, where n is an integer, is first taken to an interpolator 90 in which the sampling frequency is multiplied, or increased N-fold while N is an integer, say, 64, whereby an n-bit signal at the sampling frequency 64*$f_{in}$ is obtained at the output. The interpolated digital signal from the interpolator 90 is taken to a noise shaper 91 (sigma-delta modulator) which performs sigma-delta modulation according to FIG. 4 including quantization of the n-bit signal into a 1-bit signal. The noise shaper 91 outputs a 1-bit signal at the sampling frequency 64*$f_{in}$ that is D/A converted into an analog signal using a 1-bit D/A converter 92. The analog signal from the D/A converter 92 is taken to a low-pass filter 93, which rounds the signal and filters out signal multiples, passing through signals the frequency of which does not exceed, $f_{sig}$, thereby producing at the output an analog signal filtered to the desired frequency.

Figure 7:
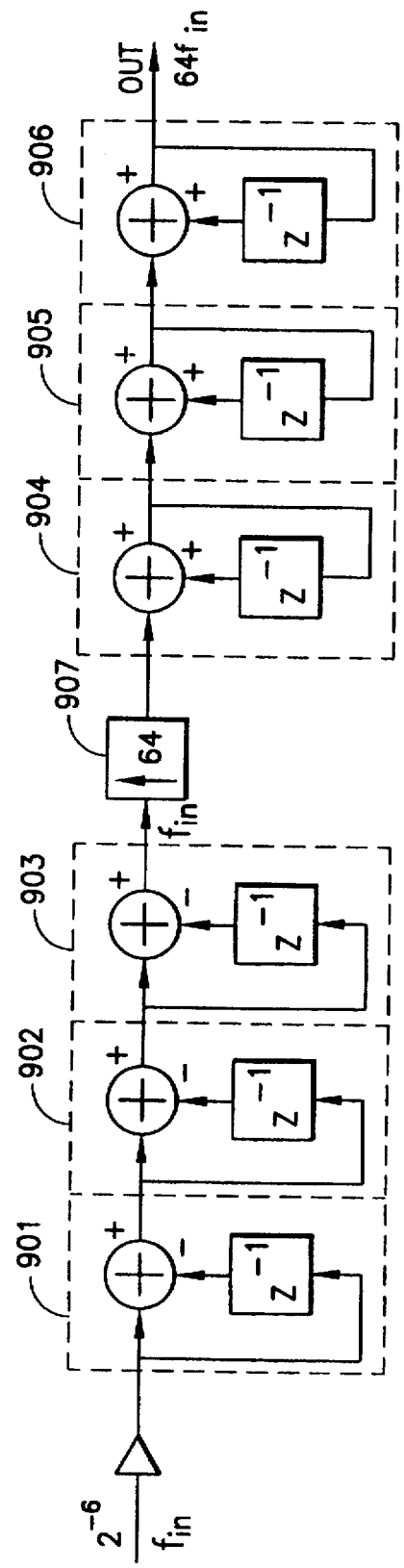
FIG. 7 shows an implementation of the interpolator block in FIG. 5.

An interpolator is known to one skilled in the art. However, FIG. 7 shows an example of the implementation of an interpolator which can be used in a sigma-delta D/A converter according to FIG. 5. At its simplest, the interpolator in FIG. 7 comprises a so-called sine type digital filter, which here implements third-order sinc filtering, ie. a $sinc^3$ function, and where the interpolation ratio is 64 in this example, whereby the sampling frequency is increased from $f_{in}$ to 64*$f_{in}$. The third-order sinc function is implemented with consecutively connected differentiators 901, 902, 903 and integrators 904, 905, 906, wherein the interpolation block 907 interpolates logic "0" samples between samples coming from the differentiators.

Figure 6:
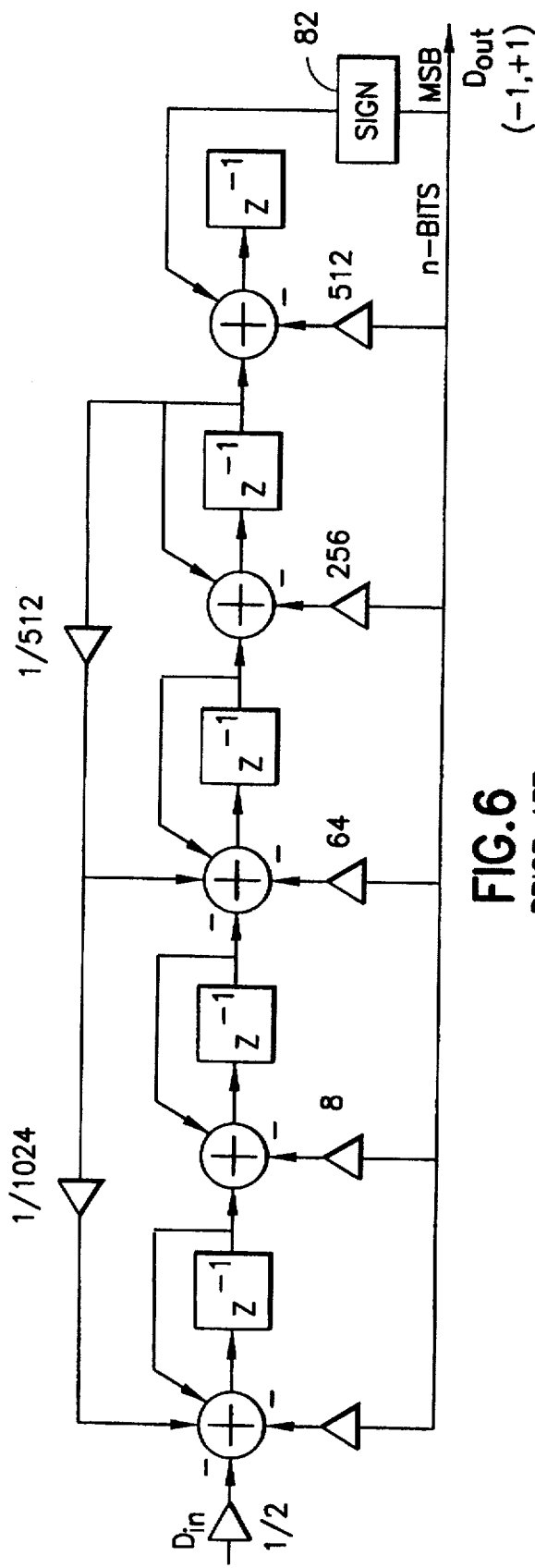
FIG. 6 shows an implementation of the sigma-delta modulator in FIG. 5.

The noise shaping block 91 in FIG. 5 may be e.g. a fifth-order noise shaper shown in FIG. 6. The noise shaper performs the so-called sigma-delta modulation and is thus functionally and structurally similar to the first-order sigma-delta modulator shown in FIG. 4. As can be seen in FIG. 6, the fifth-order noise shaper comprises five integrators and a quantizer 82, which is simply a sign detector. An n-bit signal Din is brought to the input of the shaping block of FIG. 6 and all n bits are brought to the output, but for the output Dout it is selected e.g. only the most significant bit msb of the n-bit word in order to provide a 1-bit signal as output.

Figure 8:
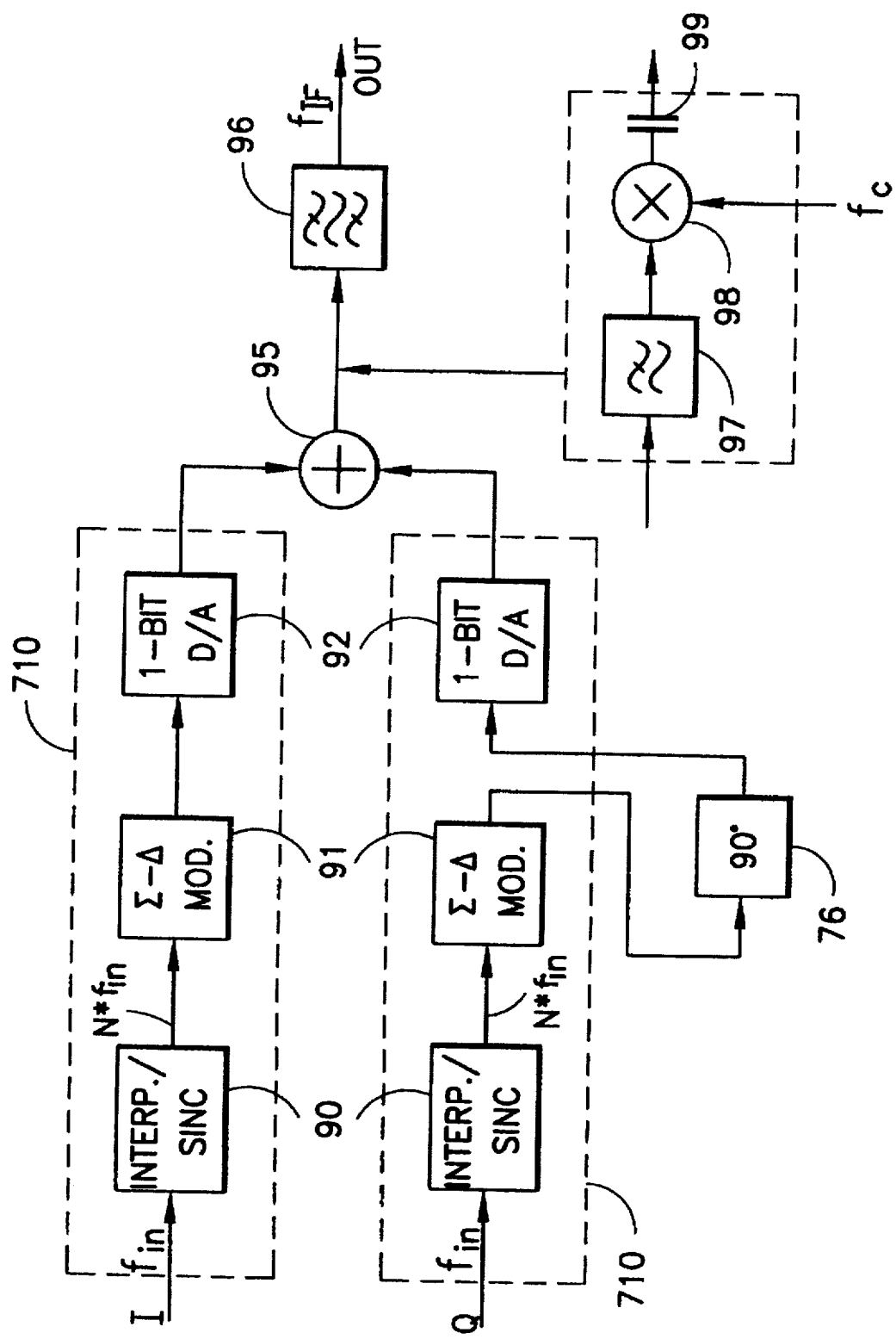
FIG. 8 shows a modulator according to the invention, implemented using a sigma-delta D/A converter.

FIG. 8 illustrates the implementation of a modulator according to the invention, applying a D/A converter 710 based on the sigma-delta principle. In the example according to FIG. 8, a complex I/Q signal is processed for which the modulator includes separate branches for the I and Q signals, and in both branches the digital I and Q signals are first fed to a digital interpolation/filter block 90, e.g. to an interpolator 90 similar to the one shown in FIGS. 5 and 7, performing the sinc filtering function and interpolation, in which the sampling frequency of an n-bit input signal at the sampling frequency $f_{in}$, where n is an integer, is increased N-fold, thus producing an n-bit output signal at the sampling frequency N*$f_{in}$ and its multiples (where all outputs can be marked $f_{Ni}$=i*N*$f_{in}$, where i=0,1,2,3, . . . , whereby $f_{Ni}$=0, N*$f_{in}$, 2N*$f_{in}$, 3N*$f_{in}$, etc.). Let it be reminded that N*$f_{in}$ is in itself a multiple of the sampling frequency $f_{in}$.

The signals obtained from the interpolators/sinc filters 90 are further taken to sigma-delta modulators 91 (noise shaping blocks), which provide at their outputs 1-bit signals at the sampling frequency $f_{Ni}$=i*N*$f_{in}$, whereby the signal sampling interval is T=1/i*N*$f_{in}$. At this stage the multiples $f_{Ni}$=N*$f_{in}$, 2N*$f_{in}$, 3N*$f_{in}$, 4N*$f_{in}$, . . . (the sampling intervals of which are, respectively, T=1/N*$f_{in}$, ½N*$f_{in}$, ⅓N*$f_{in}$, etc.) have not been filtered out, so it is possible to select for the output of the sigma-delta converters 91 a suitable one of these signals, at the intermediate or transmission frequency.

Figure 10A:
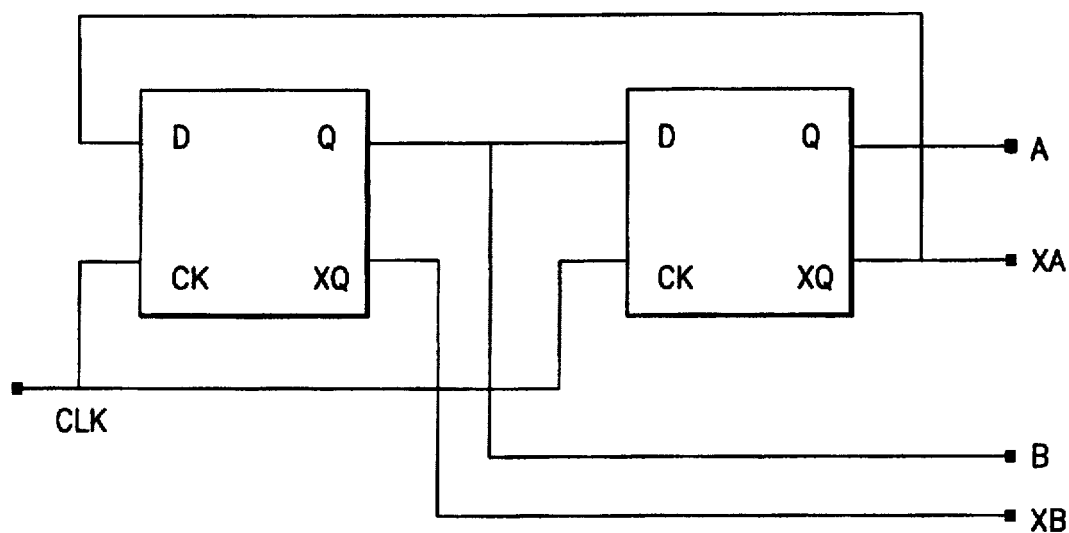
FIG. 10a shows a known Johnson counter for implementing a 90-degree phase shift digitally.
Figure 10B:
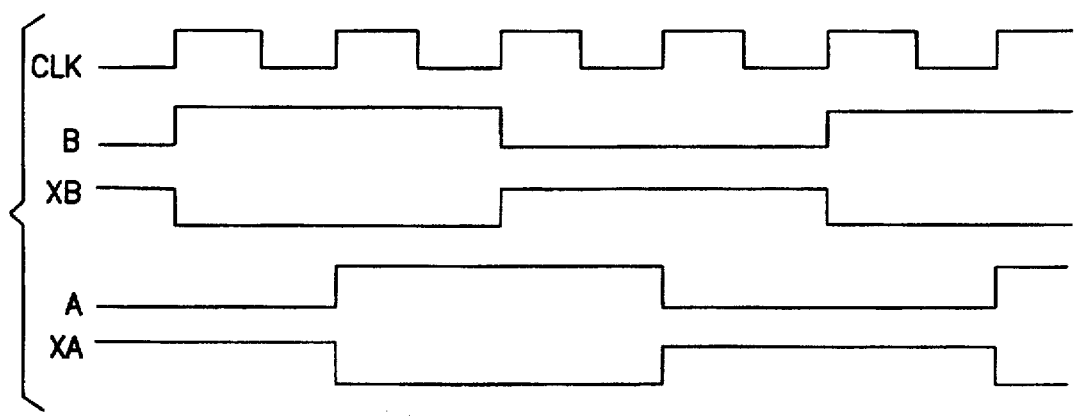
FIG. 10b shows the signal chart of the Johnson counter in FIG. 10a, FIG. 11 illustrates the generation of local frequencies in a transceiver.

Following the sigma-delta modulator 91 a 90-degree phase shifter 76 is added to the Q branch; it can be e.g. a delay element realized with logic circuits. A 90-degree phase shift is generated with a divider by delaying the Q branch signal sampling interval by one-fourth, whereby the Q branch signal sampling interval remains the same (T=1/$f_{Ni}$) when the delay is T=¼*$f_{Ni}$. The division may be performed using e.g. a so-called Johnson counter, shown in FIG. 10a, in which two D flip-flops use the clock signal CLK to generate two outputs A and B having a phase shift of 90° with respect to each other and inverted outputs XA and XB having also a phase shift of 90° with respect to each other. These signals and their phases are depicted in FIG. 10b.

The 1-bit I and Q signals with a 90° phase shift are then taken in their own branches to 1-bit D/A converters 92 that provide analog output signals which are summed in an adder 95. Alternatively, the I and Q signals may be summed digitally before they are converted to analog, in which case the digital I and Q signals with a 90° phase shift are first taken to a digital adder. Then the combined digital signal is converted in one D/A converter, which has to be a 2-bit D/A converter. There would then be no need to use two D/A converters.

Figure 9A:
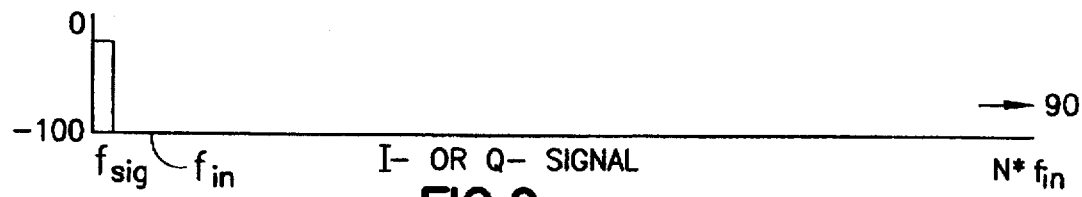
Figure 9B:
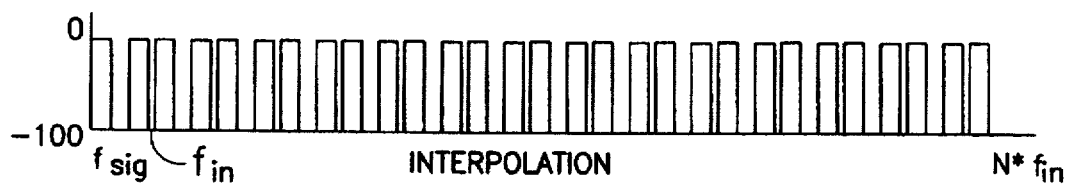
Figure 9C:
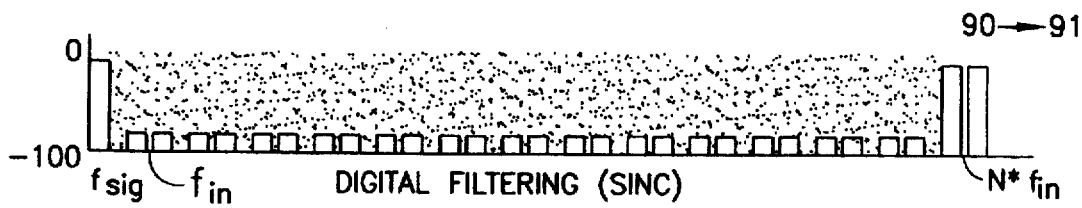
Figure 9D:
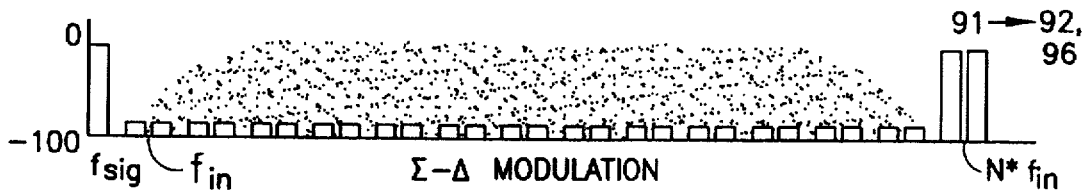
Figure 9E:
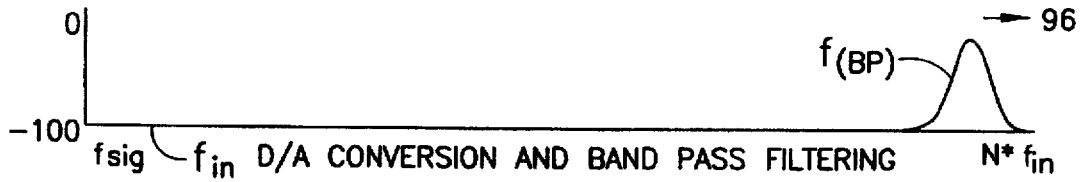

The analog signal from the adder 95 (or possible 2-bit D/A converter) is band-pass filtered in a band-pass filter 96, which provides a modulator output signal $f_{IF}$ modulated to an intermediate frequency. FIGS. 9a–9e illustrate the behaviour of the signal spectrum of a sigma-delta D/A converter according to FIG. 8 in various stages, and at the right-hand side of the figures there are the reference numbers of the signals that are taken to/obtained from the different blocks of the sigma-delta D/A converter. In particular, FIG. 9a shows the multiple frequency N*$f_{in}$ vs. $f_{sig}$ for the I - or Q - signal, and FIG. 9b shows an interpolation of the signal of FIG. 9a. FIG. 9e illustrates the selection of the multiple frequency N*$f_{in}$ (=$f_{Ni}$) as output frequency with a band-pass filter, in which $f_{(BP)}$ is the frequency response. In FIG. 9d, the quantization noise shaped in the sigma-delta modulation between the signal band $f_{sig}$ and its multiple N*$f_{in}$ (excluding them) is depicted as a gray area. In FIG. 9c, the gray area corresponds to the quantization noise spread evenly across the frequency band after the sinc filtering (prior to the sigma-delta modulation).

A capacitor can be placed prior to the band-pass filter 96 to filter out DC components and thus to make sure that the DC component will not enter the modulator output OUT. Compared to the prior art, an advantage of the invention is that the DC component is easier to filter out since the output signal is selected with a band-pass filter directly from the intermediate-frequency or transmission-frequency multiple, ie. far away from the DC component. Then a small capacitor will suffice to filter the DC component (as the passband limiting frequency of the high-pass filtering function realized by the DC filter capacitor does not have to be near the zero frequency, ie. it is not necessary that the transfer function rises steeply from the attenuation band to the passband after the zero frequency as is the case in the prior art). A small capacitor is charged more quickly, whereby the time division characteristic can be better utilized. If no suitable frequency is found directly from among multiples at the intermediate frequency, a low-pass filter or band-pass filter 97 and a mixer 98 can be arranged after the adder 95 and a suitable intermediate frequency for the output signal $f_{IF}$ can be obtained by mixing a lower frequency, e.g. a lower multiple N*$f_{in}$ (N is selected smaller) of the sampling frequency $f_{in}$. This is depicted in FIG. 8 in the area enclosed by a dotted line, which also shows the DC filter capacitor 99 mentioned above which could be placed prior to the mixer 98 or after the band-pass filter 96. Even if the method according to the invention employed a mixer 98, component saving would be achieved as compared to the prior art, since the mixing is performed for one signal only. Such an arrangement has the advantage that the sigma-delta D/A converter can be clocked by a lower clock frequency $N*f_{in}$, thus reducing power consumption, among other things.

Figure 1:
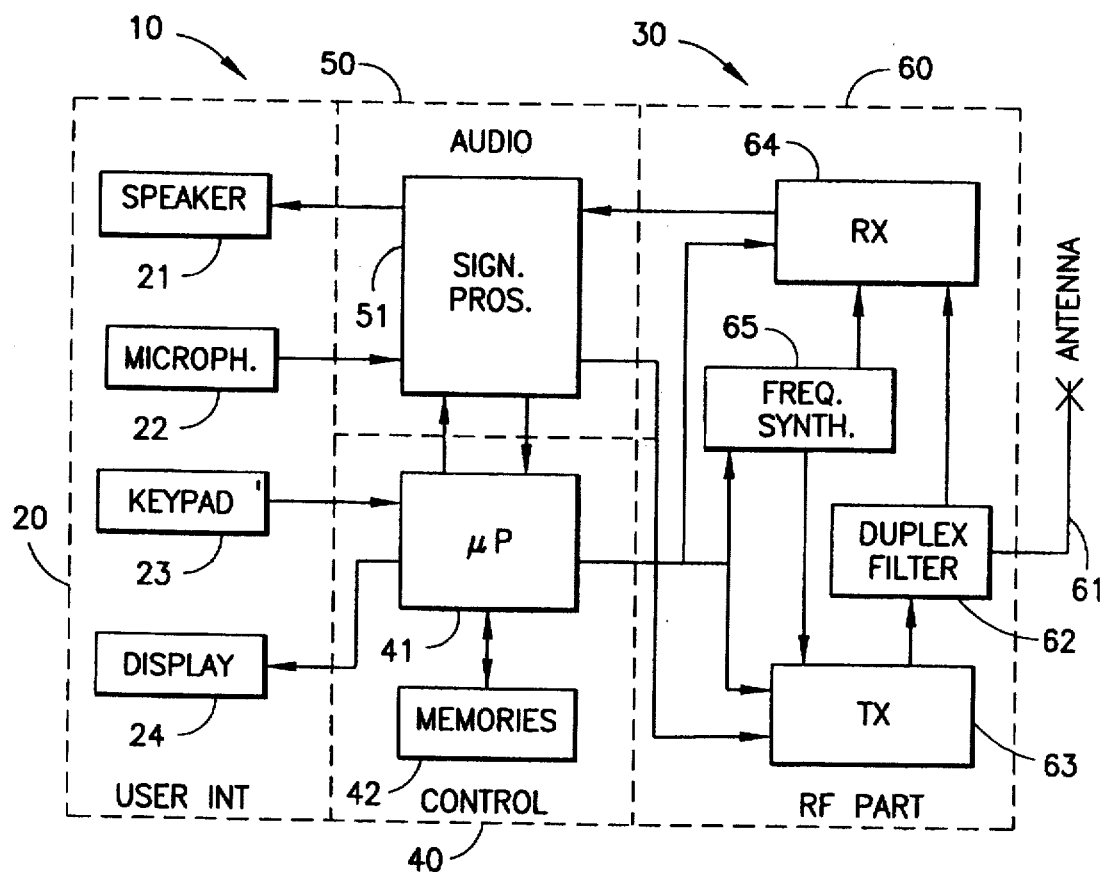
FIG. 1 shows a block diagram of a mobile phone in general.
Figure 2:
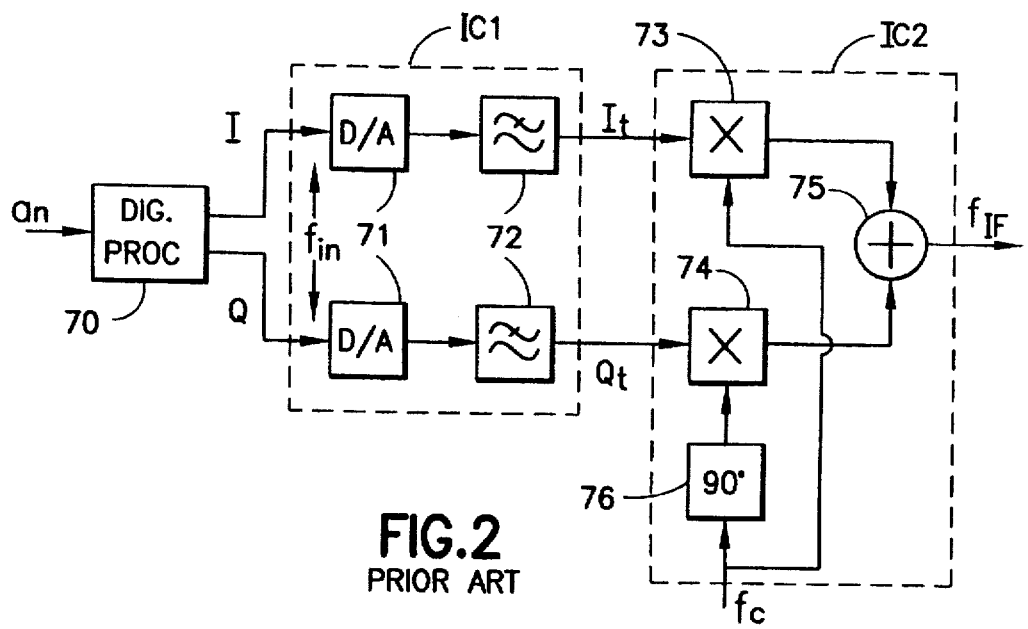
FIG. 2 shows a modulator known in the prior art.
Figure 3:
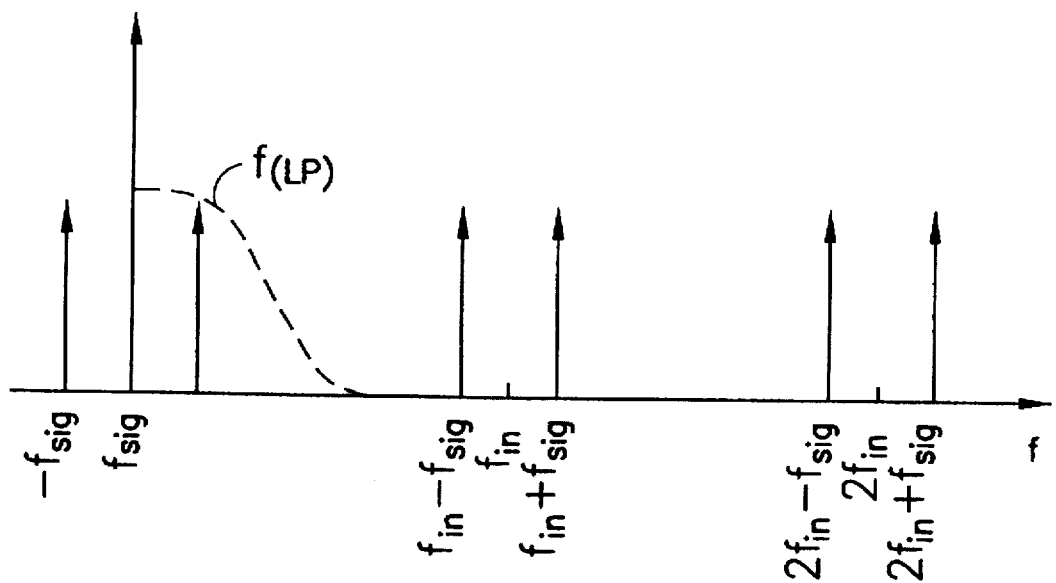
FIG. 3 shows a frequency spectrum at the outputs of D/A converters produced by a modulator according to FIG. 2.

Comparing FIGS. 8 and 2 and the arrangements depicted in them one can see that the method according to the invention saves a considerable amount of components and functions, thus making it possible to implement the modulator using only one integrated circuit. In FIG. 2, the D/A converters 71 and low-pass filters 72 are in branches of their own on an integrated circuit IC1 and the blocks performing the mixing are on another integrated circuit IC2, whereas in the arrangement according to the invention, illustrated in FIG. 8, there are only needed D/A converters 710 in both branches and one phase shifter 76. In addition, an adder 95 is needed to sum the I and Q signals, but for the filtering there is needed only one shared filter 96, which can be e.g. a dielectric, helix or corresponding RF filter. Thus, by modulating the digital signal directly to an intermediate frequency according to the invention the modulator can be implemented with a considerably smaller number of components. More components can be saved in the transmitter part of the mobile phone by selecting from the modulator a signal that is at the transmission frequency. Then there is no need to mix the IF signal to the transmission frequency in the transmitter but only to amplify and filter the signal from the modulator for transmission.

Below is an example of applying the invention in a mobile phone with reference to FIGS. 11 and 12. The example deals with a method and coupling with which the local frequencies of a mobile phone, particularly one that operates on the heterodyne principle, can be generated using a simple frequency synthesizer construction. The present invention can be used in a transceiver according to FIGS. 11 and 12 to generate the first intermediate frequency of the transmitter. A functioning frequency synthesization of an analog, digital or dual-mode mobile phone can be implemented according to the example below and it can be used e.g. in TDMA mobile communication systems based on simultaneous transmission and reception which may be used in the future, and in a CDMA mobile communication system.

In the following embodiment example the generation of local frequencies is based on that in a double-IF continuously operating transceiver, or a so-called double super construction, where the first intermediate frequency of the receiver or the second intermediate frequency of the transmitter is double with respect to the duplex interval and the other one equals the duplex interval, it is possible, in addition to the UHF local frequencies of the transmitter and receiver, to generate also the VHF local frequencies with one frequency synthesizer. This is achieved by selecting for the first intermediate frequency of the transmitter a frequency that is two times the second intermediate frequency of the receiver, if the second intermediate frequency of the transmitter is higher than the first intermediate frequency of the receiver, or, correspondingly, selecting for the second intermediate frequency of the receiver a frequency that is two times the first intermediate frequency of the transmitter, if the first intermediate frequency of the receiver is higher than the second intermediate frequency of the transmitter. The VHF local frequencies are either obtained directly from the frequency synthesizer output or they are generated by dividing or multiplying the synthesizer output frequency by 2, as appropriate. Advantageously, a multiple of the symbol frequency of the received signal is selected as the second intermediate frequency of the receiver and the first intermediate frequency of the transmitter is generated by a modulator according to the invention. In actual mobile communication systems, the receive channel frequency range is usually one duplex interval above the transmit channel frequency range. Then the second intermediate frequency of the transmitter is higher than the first intermediate frequency of the receiver, when using one frequency synthesizer to generate the UHF local frequencies of the receiver and transmitter and an upper UHF injection in the first mixer stage of the receiver. The implementation depicted in FIG. 11 illustrates the matter.

Typically, a multiple of the symbol frequency of a digital system is selected for the second intermediate frequency of the receiver, whereby signal sampling with A/D converters for digital detection is simple. The sampling clock frequency, as is known, is a multiple of the symbol frequency and at least two times higher than the symbol frequency. Also a received FM signal according to an analog system can be detected by sampling as described above.

Figure 11:
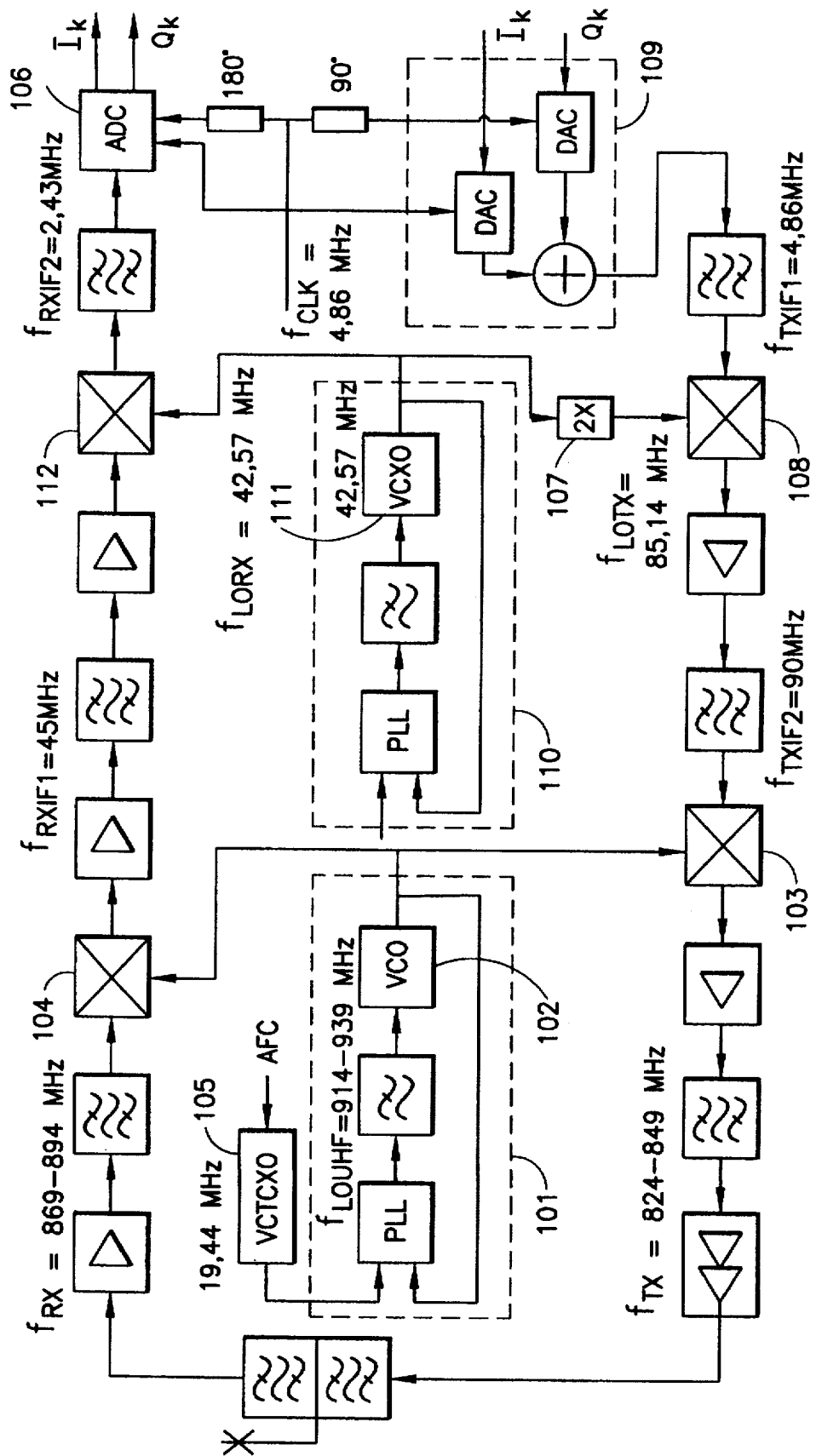

In the example according to FIG. 11, the receiver frequency range is 869 to 894 MHz and the transmitter frequency range 824 to 849 MHz. The frequency division conforms with the USDMR specification. As described above, a 45 MHz frequency that equals the duplex interval is selected for the first intermediate frequency $f_{RXIF1}$ of the receiver and a frequency of 90 MHz that is double the duplex interval is selected for the second intermediate frequency $f_{TXIF2}$ of the transmitter. A UHF synthesizer 101 generates the UHF local frequency $f_{LOUHF}$ of both the transmitter and receiver, in this case 914 to 939 MHz. The local frequency is mixed with the second intermediate frequency $f_{TXIF2}$ of the transmitter in a mixer 103 using upper injection and with the carrier-frequency receiver signal $f_{RX}$ in a mixer 104. The reference oscillator of the synthesizer is e.g. a 19.44-MHz crystal oscillator 105 controlled with an automatic frequency control (AFC) voltage.

A multiple of the symbol frequency of the received signal, 2.43 MHz, is selected as the second intermediate frequency $f_{RXIF2}$ of the receiver. The receiver VHF local frequency $f_{LORX}$, which is taken to a mixer 112 to generate the second intermediate frequency, is thus 42.57 MHz. Sampling of the received signal is performed using an A/D converter 106 the clock frequency $f_{CLK}$ of which in this case is 4.86 MHz which is double the second intermediate frequency of the receiver.

From the first intermediate frequency $f_{TXIF1}$ of the transmitter and the second intermediate frequency $f_{RXIF2}$ of the receiver, one is double the other. The first intermediate frequency $f_{TXIF1}$ of the transmitter is in this case 4.86 MHz which equals the sampling clock frequency $f_{CLK}$. The transmitter VHF local frequency $f_{LOTX}$, 85.14 MHz, can be generated from the receiver VHF local frequency $f_{LORX}$ by multiplying it with a 2-multiplier 107. One alternative is to filter the desired intermediate frequency $f_{TXIF2}$ directly from the output of the transmitter mixer 108. Multiplying by two can also be carried out using a subharmonic mixer as the mixer 108.

It is also advantageous for the implementation that the first intermediate frequency $f_{TXIF1}$ and the sampling clock frequency $f_{CLK}$ are such that one of the frequencies can be evenly divided by the other. Then the modulation can be performed directly to the first intermediate frequency $f_{TXIF1}$ of the transmitter using an rf modulator according to the present invention, represented by block 109.

The resonator of a voltage-controlled oscillator (VCO) 111 may be a 42.57-MHz crystal since, unlike in known arrangements in which the output frequency has to be changed, no wide adjusting range is required of the VCO. An advantage of the crystal is low phase noise when compared to an LC resonator implemented using discrete components. Therefore, with a crystal there is achieved good noise immunity which is particularly advantageous when trying to accomplish structures that are more immune to interferences.

Use of a crystal also makes it possible to turn off the phase-locked loop to reduce power consumption. This can be done because the frequency stability of a local frequency generated by a crystal is sufficient in the reception without phase locking. This feature can be used advantageously e.g. in a dual-mode DAMPS network when the phone is in the standby state wherein the base station is sending signalling messages in an analog control channel.

Figure 12:
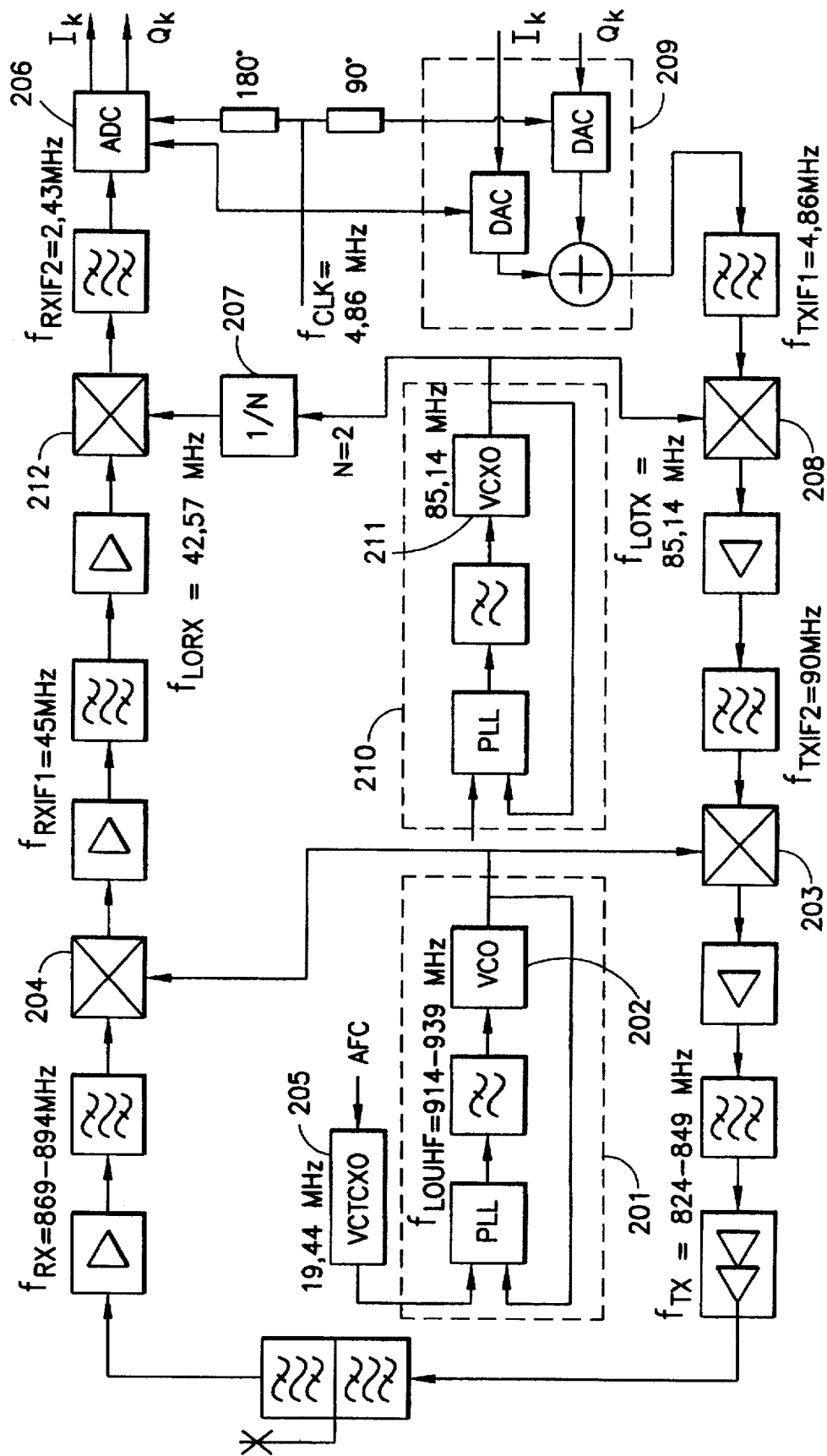
FIG. 12 shows an alternative implementation for a transceiver similar to the one in FIG. 11.

According to the structure shown in FIG. 12, the VHF crystal oscillator may also be a 85.14-MHz harmonic crystal oscillator 211, whereby the 2-multiplier 107 of FIG. 11 can be removed and a 2-divider 207 can be added to the coupling to generate the receiver VHF local frequency $f_{LORX}$. The divider can be advantageously applied in the generation of balanced local frequencies required by quadrature demodulation. Otherwise, the transceiver of FIG. 12 is identical to that of FIG. 11, although the reference numbers in FIG. 11 begin with 100 and in FIG. 12 with 200.

In general, regardless of the number of intermediate frequencies in a radio telephone, it can be stated that when the $(k+1)^{th}$ intermediate frequency of a transmitter is obtained from the output of the transmitter mixer on the signal path and the $k^{th}$ intermediate frequency of the receiver is taken to the receiver mixer on the signal path and one of the intermediate frequencies equals the duplex interval and the other is double the duplex interval, the transmitter and receiver local frequencies taken to said mixers can be generated using one frequency synthesizer without a frequency hop. Then the values of the $k^{th}$ intermediate frequency taken to the transmitter mixer and the $(k+1)^{th}$ intermediate frequency obtained from the output of the receiver mixer are selected such that one is double the other. Here k is a positive integer. When applied to the double super arrangement described above, k becomes 1.

Above it has been described how it is possible to implement, using a simple construction, frequency synthesization in a radio telephone, suitable for analog, digital and dual-mode radio telephones and capable of employing a modulator according to the invention. The frequency synthesization described here can also be used in phase-locked TDMA and CDMA systems based on simultaneous transmission and reception. Using a crystal as the resonator in the synthesizer VCO, the local frequency phase noise and interference sensitivity can be reduced when compared with prior art arrangements. The power consumption can be further reduced by turning off the phase lock circuit when the telephone is in the standby state, listening to an analog control channel.

According to the present invention, a digital signal, advantageously a complex I/Q signal, is modulated directly to an intermediate frequency or transmission frequency by selecting as the output signal one of the multiples of the sampling frequency. Advantageously, a modulator that increases the sampling frequency to its multiples is used in the modulation. In a preferred embodiment of the invention, the modulation of a complex digital I/Q signal to an intermediate frequency or transmission frequency is performed directly with a sigma-delta D/A converter or a D/A converter of similar type.

We claim:

1. A method for modulating a digital signal to a higher-frequency analog signal, wherein a baseband digital signal (I, Q) is taken to a digital-to-analog converter (71, 710), in which said digital signal (I, Q) is sampled at a certain sampling frequency ($f_{in}$) and converted to an analog signal and wherein the digital-to-analog converter (71, 710) produces, as a result of the conversion, a baseband signal ($f_{sig}$) and signals ($f_{Ni}$) at multiples of the sampling frequency ($f_{in}$), characterized in that one of said signals ($f_{Ni}$) at multiples of the sampling frequency ($f_{in}$) is selected as the output signal ($f_{IF}$).

2. The method of claim 1, characterized in that an intermediate-frequency signal ($f_{Ni}$) produced by the digital-to-analog converter at a multiple of the sampling frequency ($f_{in}$) is selected as the output signal ($f_{IF}$).

3. The method of claim 1, characterized in that a transmission-frequency signal ($f_{Ni}$) produced by the digital-to-analog converter at a multiple of the sampling frequency ($f_{in}$) is selected as the output signal ($f_{IF}$).

4. The method of claim 1, characterized in that the output signal is selected by filtering.

5. The method of claim 1, characterized in that prior to the selection of the output signal the sampling frequency ($f_{in}$) of said digital signal is increased in a digital-to-analog converter (90).

6. The method of claim 5, characterized in that the sampling frequency ($f_{in}$) is increased by interpolating.

7. The method of claim 5, characterized in that after the increasing of the sampling frequency ($f_{in}$) of said digital signal the signal is processed using sigma-delta modulation (91).

8. The method of claim 7, characterized in that said digital signal is a complex digital signal comprising an I component and a Q component and prior to the conversion of the digital signal to an analog signal the phase of said Q component is shifted into a 90-degree phase shift in relation to said I component.

9. Use of the method of claim 1 in a mobile phone.

10. A modulator for modulating a digital signal to a higher-frequency analog signal, comprising a digital-to-analog converter (71, 710) for sampling a baseband digital signal (I, Q) at a certain sampling frequency ($f_{in}$) and for converting it to an analog signal, wherein the digital-to-analog converter (71, 710) produces as output a baseband signal ($f_{sig}$) and signals ($f_{Ni}$) at multiples of the sampling frequency ($f_{in}$), characterized in that it includes a means (90, 96) for selecting the output signal ($f_{IF}$) from said signals ($f_{Ni}$) at multiples of the sampling frequency ($f_{in}$).

11. The modulator of claim 10, characterized in that the digital-to-analog converter (71, 710) includes a means (90) for increasing the sampling frequency ($f_{in}$).

12. The modulator of claim 11, characterized in that said means (90) for increasing the sampling frequency ($f_{in}$) includes an interpolator.

13. The modulator of claim 10, characterized in that said means for selecting the output signal ($f_{IF}$) from said signal ($f_{Ni}$) at multiples of the sampling frequency ($f_{in}$) comprises a filtering means (90, 96).

14. The modulator of claim 10, characterized in that said filtering means (90, 96) comprises a digital filter (90).

15. The modulator of claim 14, characterized in that said digital filter (90) is a sinc filter.

16. Use of the modulator of claim 10 in a mobile phone.

* * * * *